Patented Dec. 3, 1935

2,023,296

UNITED STATES PATENT OFFICE 2,023,296

PROCESS OF MAKING CELLULAR RUBBER

Geoffrey William Trobridge, Sutton Coldfield, England, assignor to Dunlop Rubber Company Limited, London, England, a British company No Drawing. Application September 1, 1934, Serial No. 742,475. In Great Britain December 27, 1933

3 Claims. (Cl. 18—53)

This invention comprises improvements in or relating to the manufacture of goods of or containing sponge-like or cellular rubber or similar material of the kinds hereinafter specified.

Processes have already been proposed for the manufacture of goods of rubber or similar material of sponge-like or cellular structure from aqueous dispersions of rubber or the like by converting the aforesaid dispersions into a frothy condition wherein the froth comprises a gas and the emulsions or dispersions in the reversible condition and thereafter causing the frothy mass to set to a permanent structure of irreversible solid material. In such processes aqueous dispersions of rubber or the like can be employed which are or have been rendered capable of gelling on the application of heat or to which substances have been added to cause the dispersions to gel in the cold after a definite and controllable time interval.

According to the present invention the process for the manufacture of goods of rubber or similar material of sponge-like or cellular structure from aqueous emulsions or dispersions comprises admixing in the aforesaid emulsions or dispersions variable quantities of one or more reagents which by chemical decomposition or chemical interaction with one another or with the aqueous medium of the emulsions or dispersions aforesaid produce one or more substances in situ which function as active coagulating agents and one or more substances which function as inflating agents, and allowing the frothy mass to set to a permanent structure of irreversible solid material.

Among the reagents which can be employed for the purpose of this invention are, for instance, such reactive metals as zinc, magnesium, aluminium or iron or such compounds as calcium carbide or aluminium carbide in the presence of such soluble substantially inactive salts as the sulphates, chlorides, nitrates and acetates of the alkali metals including ammonium.

It is usually desirable to add froth-forming or lather-forming substances to the aqueous dispersions if such substances are not already present in sufficient amounts. Examples of such froth-forming or lather-forming substances are soap, soap-forming ingredients or saponin.

When heat is employed to hasten the formation of the inflating agent and/or the conversion of the foam or froth produced to a solid or sponge-like structure, the temperature should not be so high as to cause breakdown in the cell structure, e. g., the temperature should not be above the boiling point of water.

The emulsions or dispersions of rubber material as this term is used in this specification comprise by way of example, aqueous emulsions consisting of or containing rubber, gutta-percha, balata or similar vegetable resins, occurring naturally or artificially obtained and in vulcanized or unvulcanized condition, and also coagulated rubber, vulcanized rubber, synthetic rubber, waste or reclaim, if desired, as alternatives or admixtures. Any of the aforesaid dispersions may contain the usual known compounding ingredients. Concentrates such as are obtained in Patent No. 1,846,164 or in British Patent No. 219,635 to which may be added any one or more of the usual compounding ingredients, preferably excepting those which would tend to form insoluble soaps or to increase the surface tension of the foamy mass, may also be used.

The following example illustrates how the process can be effected:

To 1000 c. c. of latex mixing containing 50% total solids including the usual vulcanizing and frothing ingredients is added with stirring 200 c. c. of an aqueous solution of ammonium sulphate containing 50 grams of ammonium sulphate. 10 grams of finely divided magnesium metal is then stirred into this mixture and the whole gently warmed. A rapid reaction results, in the course of which the magnesium is dissolved to give a solution presumably of magnesium sulphate which induces coagulation of the latex mixing, while at the same time, hydrogen and ammonia are apparently evolved, which gases produce a substantial inflation. The solid product ultimately obtained is dried and vulcanized in known manner, e. g., for two hours in air at 95° C. The spongy material is subsequently boiled in water for 30 minutes and allowed to dry. Zinc or aluminum or other reactive metals or compounds, such as carbides, etc., may be substituted for the magnesium in the above example, and other suitable salts may be substituted for the ammonium sulphate.

What I claim is—

1. A process for the manufacture of goods of rubber material of sponge-like or cellular structure from aqueous dispersions which comprises admixing into the dispersions a reagent containing a salt of the class consisting of the sulphates, chlorides, nitrates and acetates of the alkali metals and ammonium and a metal of the class consisting of zinc, magnesium, aluminum and iron which by chemical interaction or decomposition produce in situ in said dispersions an inflating agent and a coagulating agent and permitting the frothy mass formed by the inflating agent to set to a permanent structure of irreversible solid material by the action of the coagulating agent formed by the chemical reaction.

2. A process for the manufacture of goods of rubber material of sponge-like or cellular structure from aqueous dispersions which comprises admixing into the dispersion a salt of the class consisting of the sulphates, chlorides, nitrates and acetates of the alkali metals and ammonium and finely divided magnesium metal to produce in situ in said dispersion an inflating agent and a coagulating agent and permitting the frothy mass formed by the inflating agent to set to a permanent structure of irreversible solid material by the action of the coagulating agent formed by the chemical reaction.

3. A process for the manufacture of goods of rubber material of sponge-like or cellular structure from aqueous dispersions which comprises admixing into the dispersions ammonium sulphate and finely divided magnesium metal to produce an inflating agent and a coagulating agent and permitting the resulting frothy mass to set to a permanent structure of irreversible solid material.

GEOFFREY WILLIAM TROBRIDGE.